United States Patent [19]
Adams

[11] Patent Number: 6,029,824
[45] Date of Patent: Feb. 29, 2000

[54] SCREEN FOR VIBRATING SEPARATOR

[75] Inventor: Thomas C. Adams, Hockley, Tex.

[73] Assignee: Tuboscope I/P, Inc., Houston, Tex.

[21] Appl. No.: 09/064,349

[22] Filed: Apr. 22, 1998

Related U.S. Application Data

[60] Division of application No. 08/598,566, Feb. 12, 1996, which is a continuation-in-part of application No. 08/220,101, Mar. 30, 1994, Pat. No. 5,490,598.

[51] Int. Cl.$^7$ .................................................. B07B 1/49
[52] U.S. Cl. ........................ 209/401; 209/392; 209/397; 209/399; 209/403
[58] Field of Search .................................. 209/392, 397, 209/399, 401

[56] References Cited

U.S. PATENT DOCUMENTS

| | | | |
|---|---|---|---|
| H1481 | 9/1995 | Ray | 428/98 |
| 40,242 | 10/1863 | Capell . | |
| 516,673 | 3/1894 | Wilson . | |
| 966,578 | 8/1910 | Murphy et al. | 209/401 X |
| 1,132,667 | 3/1915 | Milliot . | |
| 1,139,041 | 5/1915 | Larson . | |
| 1,250,768 | 12/1917 | Baumgartner | 209/392 |
| 1,713,143 | 5/1929 | Overstrom . | |
| 1,716,758 | 6/1929 | Bland . | |
| 1,997,713 | 4/1935 | Boehm | 209/401 X |
| 1,998,033 | 4/1935 | Tucker | 245/2 |
| 2,052,467 | 8/1936 | Hermann | 209/401 |
| 2,061,850 | 11/1936 | Roberts . | |
| 2,397,646 | 4/1946 | Brown et al. | 219/58 |
| 2,487,830 | 11/1949 | Robbins | 442/2 |
| 2,800,227 | 7/1957 | Kiger | 209/412 X |
| 2,813,629 | 11/1957 | Brugmann | 209/403 |
| 2,973,865 | 3/1961 | Cibula | 209/392 X |
| 2,985,303 | 5/1961 | Wright . | |
| 3,255,885 | 6/1966 | Burls | 209/401 X |
| 3,285,413 | 11/1966 | Taylor-Smith . | |
| 3,542,636 | 11/1970 | Wandel | 161/114 |
| 3,574,103 | 4/1971 | Latkin | 161/43 |
| 3,900,628 | 8/1975 | Stewart . | |

(List continued on next page.)

FOREIGN PATENT DOCUMENTS

| | | |
|---|---|---|
| PCT/GB91/00957 | of 1991 | WIPO . |
| PCT/US94/00243 | of 1994 | WIPO . |
| PCT/EP96/03103 | of 1996 | WIPO . |

OTHER PUBLICATIONS

"The Future of Fine Screening," Derrick Equipment Co. Apr. 1993.
"Derrick Pyramid Screens," Derrick Corp. (No Date).
Int'l Search Report, PCT/GB97/00385 co-owned with present application.

*Primary Examiner*—Donald P. Walsh
*Assistant Examiner*—Daniel K. Schlak
*Attorney, Agent, or Firm*—Guy McClung

[57] ABSTRACT

A substantially planar screen for a solid particle separator is formed from one or more layers of mesh. The one or more layers of mesh are formed into a series of ridges separated by channels within the plane of the screen. The wire mesh is bonded to a rigid or semi-rigid panel having a plurality of relatively large openings as compared to those of the mesh to create a plurality of repairable screen cells. The support panel is formed with or bent into a series of alternating ridges and channels to create the ridges and channels in the wire mesh when it is bonded to the panel. The cross-sectional shape of the ridges are generally triangular to maximize exposure of surface area of the screen to a flow of material to be separated. Flat surfaces on the ridges and in the channels facilitate repair of screen cells with solid plugs.

43 Claims, 6 Drawing Sheets

U.S. PATENT DOCUMENTS

| | | | |
|---|---|---|---|
| 4,380,494 | 4/1983 | Wilson . | |
| 4,472,473 | 9/1984 | Davis et al. | 428/184 |
| 4,575,421 | 3/1986 | Derrick et al. | 209/397 |
| 4,696,751 | 9/1987 | Eifling | 209/403 X |
| 4,760,980 | 8/1988 | Sharpe | 245/2 |
| 4,769,968 | 9/1988 | Davis et al. | 52/814 |
| 4,857,176 | 8/1989 | Derrick et al. | 209/392 |
| 4,940,500 | 7/1990 | Tadokoro et al. | 156/204 |
| 4,954,249 | 9/1990 | Gero et al. | 209/273 |
| 5,028,474 | 7/1991 | Czaplicki | 428/178 |
| 5,139,154 | 8/1992 | Gero et al. | 209/273 |
| 5,162,143 | 11/1992 | Porter et al. | 428/179 |
| 5,275,293 | 1/1994 | Crider | 209/319 |
| 5,417,793 | 5/1995 | Bakula | 156/308.2 |
| 5,417,858 | 5/1995 | Derrick et al. | 210/388 |
| 5,417,859 | 5/1995 | Bakula | 210/388 |
| 5,490,598 | 2/1996 | Adams | 209/401 |
| 5,636,749 | 6/1997 | Wojciechowski | 209/403 |
| 5,720,881 | 2/1998 | Derrick et al. | 210/388 |
| 5,851,393 | 12/1998 | Carr et al. | 204/489 |
| 5,868,929 | 9/1999 | Derrick et al. | 210/388 |
| 5,876,552 | 3/1999 | Bakula | 156/308.2 |

SCREEN FOR VIBRATING SEPARATOR

RELATED APPLICATIONS

This is a division of U.S. application Ser. No. 08/598,566 filed 2/12/96 entitled "Screen For Vibrating Separator" which is a continuation-in-part of U.S. application Ser. No. 08/220,101 filed 3/30/94 of the same title, issued as U.S. Pat. No. 5,490,598.

FIELD OF INVENTION

The invention relates generally to screens for use on vibrating separators or shakers for separating particles.

BACKGROUND OF INVENTION

Vibrating screens have been employed for many years to separate particles in a wide array of industrial applications. One common application of vibrating screens is in drilling operations to separate particles suspended in drilling fluids. The screens are generally flat and are mounted generally horizontally on a vibrating mechanism or shaker that imparts either a rapidly reciprocating linear, elliptical or circular motion to the screen. Material from which particles are to be separated is poured onto a back end of the vibrating screen, usually from a pan mounted above the screen. The material generally flows toward the front end of the screen. Large particles are unable to move through the screen, remaining on top of the screen and moving toward the front of the screen where they are collected. The smaller particles and fluid flows through the screen and collects in a pan beneath the screen.

A vibrating screen may be formed from one or more layers of wire mesh. Wire mesh is generally described with reference to the diameter of the wires from which it is woven, the number wires per unit length (called a mesh count) and the shape or size of the openings between wires. Wire mesh comes in various grades. "Market" grade mesh generally has wires of relative large diameter. "Mill" grade has comparatively smaller diameter wires and "bolting cloth" has the smallest diameter wire. The type of mesh chosen depends on the application. Smaller diameter wires have less surface and thus less drag, resulting in greater flow rates. Smaller diameter wires also result, for a given opening size, in a larger percentage of open area over the total area of the screen, thus allowing greater flow rates and increased capacity. However, screens of bolting cloth tears more easily than market or mill grade screens, especially when used in harsh conditions such as drilling and mining operations. The smaller diameter wires tend to have less tensile strength and break more easily, and the finer mesh also tends not to retain its shape well.

Most meshes suffer from what is termed as "near sized particle blinding." During vibration, wires separate enough to allow particles of substantially the same size or slightly larger than the openings to fall between the wires and become lodged, thus "blinding" the openings of the screen and reducing capacity of the screen. If a particle becomes lodged when the wires are at a maximum distance apart, it is almost impossible to dislodge the particle. Sometimes, however, wires will subsequently separate further to release the lodged particle. Unfortunately, some wire mesh, especially bolting cloth, is tensioned. Tensioning restricts movement of the wires. Restricting movement assists in holding the shape of the wire mesh, keeping the size of the openings consistent to create a more consistent or finer "cutting point" and reducing abrasion from wires rubbing against each other. However, restricted movement of the wires reduces the probability that, once a near sized particle becomes stuck, the wires will subsequently separate to allow the particle to pass. Use of smaller diameter wires, with smaller profiles, helps to reduce blinding. With a smaller diameter wire, a particle is less likely to become lodged midway through the opening.

Multiple layers of mesh may be used to alleviate blinding. U.S. Pat. No. 4,033,865 to Derrick, Jr., describes layering two meshes in a manner that results in at least one wire of the lower of the two meshes bisecting each opening in the upper mesh. The openings in each mesh are at least twice as wide as the diameters of the wires and the lower mesh has openings the same size as or slightly larger than the openings in the upper mesh. The lower mesh, when held tightly against the upper mesh, prevents particles from migrating far enough into an opening in the upper mesh to be trapped. Some relative movement of the layers also helps to dislodge particles caught in the upper layer. The two-layer arrangement has the further benefit of a finer "cutting point," allowing smaller particles to be separated out. A third "backing" layer of relatively coarse, mill grade mesh is often used to carry most of the load on the screen and to increase the tensile strength of the screen.

Another problem faced in most applications is the inevitable tearing of the screen. The problem can be especially acute in heavy duty applications such as drilling and mining. A torn screen must be replaced or repaired. To facilitate repair, the screen layers are bonded to a rigid or semi-rigid support panel that has a pattern of large openings, forming on the screen a plurality of small cells of wire mesh. When a tear occurs in the screen, the mesh remaining within the cell in which the tear occurred is cut out and the cell is plugged. The capacity of the screen is diminished but its life is extended. Typically, several cells of a screen can be repaired before its capacity drops far enough to require replacement. Unfortunately, bonding the screen to the support panel further restricts relative movement of the layers and the wires in each mesh layer, thus compounding the problem of blinding.

Blinding and tearing of the screens are inevitable, and thus capacity of the screen continually drops through its useful life. Although capacity can be increased by increasing the total area the screens, the size of the screen is limited in most applications, such as on drilling rigs, especially those on offshore platforms. There has thus been generally a trade-off between capacity, longevity, repairability and resistance to blinding of the screens.

SUMMARY OF INVENTION

The invention is a screen for a vibrating separator or shaker that has increased capacity without an increase in overall dimensions. It furthermore accommodates desirable attributes such as resistance to blinding, repairability and longevity. The screen, substantially horizontal when placed on a separator for operation, is formed from one or more layers of mesh. The one or more layers of mesh are formed into an alternating series of ridges and channels lying substantially within the plane of the screen.

The ridges increase the surface area of the screen without increasing the overall dimensions of the screen, thus improving flow capacity. Additionally, particles tend to drop into the channels, leaving the tops of the ridges exposed to fluids for relatively unimpeded flow through the screen that further improves flow rates. Furthermore, the ridges and channels tend to assist in evenly distributing separated particles across the screen. Uneven distribution, due to for example rolling of the screen from side to side when used on offshore platforms, degrades flow capacity of the screen.

In accordance with another aspect of the invention, the wire mesh is bonded to a rigid or semi-rigid panel having an array of openings that are very large as compared to those of the mesh. The support panel is formed with or bent into a series of alternating ridges and channels to create the ridges and channels in the wire mesh when it is bonded to the panel. The openings in the panel create, in effect, a plurality of individual screen cells when the wire mesh is bonded to the panel around each opening. When a portion of wire mesh fails or is torn within a cell, the screen is repaired by cutting the remaining mesh from the cell opening and plugging the cell opening with a solid piece of material.

In accordance with another aspect of the invention, the ridges and channels of the panel have substantially flat surfaces on which the openings are located. A substantially planar opening allows a flat plug to be inserted into the opening for improved fit and sealing. The plug is preferably formed with an edge that facilitates insertion into opening and into which the edge of the cell opening snugly fits, making a repair quick and easy.

In accordance with another aspect of the invention, the ridges have a generally triangular cross section. In a preferred embodiment, the ridges are formed from two surfaces in a triangular configuration and the channel is formed from a flat bottom surface extending between the ridges. This geometry tends to maximize effective or useful surface area of the screen, especially if flat surfaces are used on the ridge to facilitate repair. During normal operation of the separator or shaker, most of the particles fall into the channel and the material to be separated tends to flow through the screen along the sides of the ridges and the bottom of the channel. A generally triangular configuration of the ridge tends to expose greater screen area to the flow and to minimize the amount of area on top of the ridge that tends not to be exposed to material flow.

These and other aspects and advantages of the invention are evidenced by the following detailed description of preferred embodiments of the invention illustrated in the appended drawings.

BRIEF DESCRIPTION OF DRAWINGS

FIG. 4 is an end view of the screen of FIG. 3.

DETAILED DESCRIPTION OF PREFERRED EMBODIMENTS

In the following description, like numbers refer to like parts.

Figure 1:
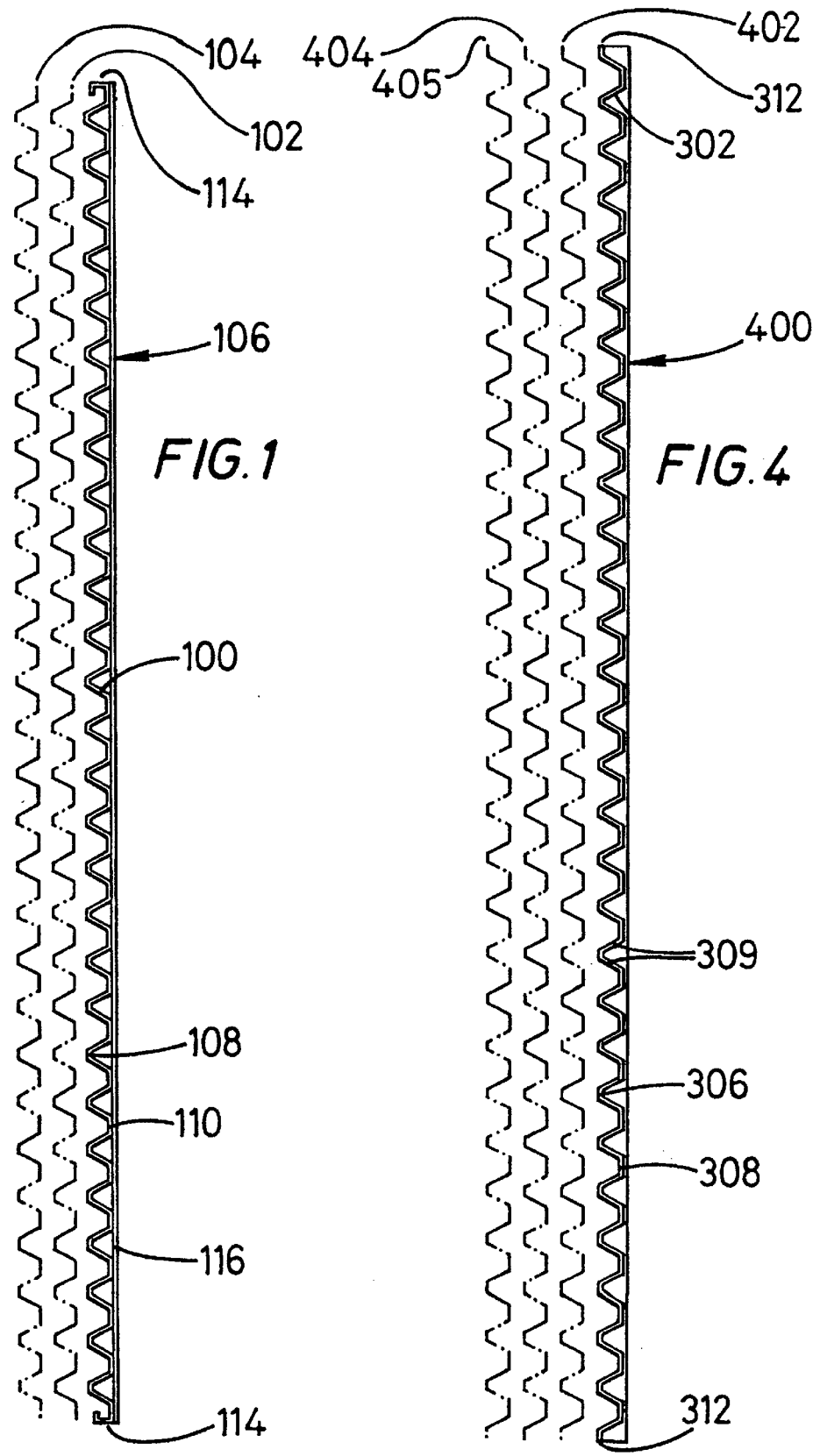
FIG. 1 is an end view of a screen.
Figure 2:
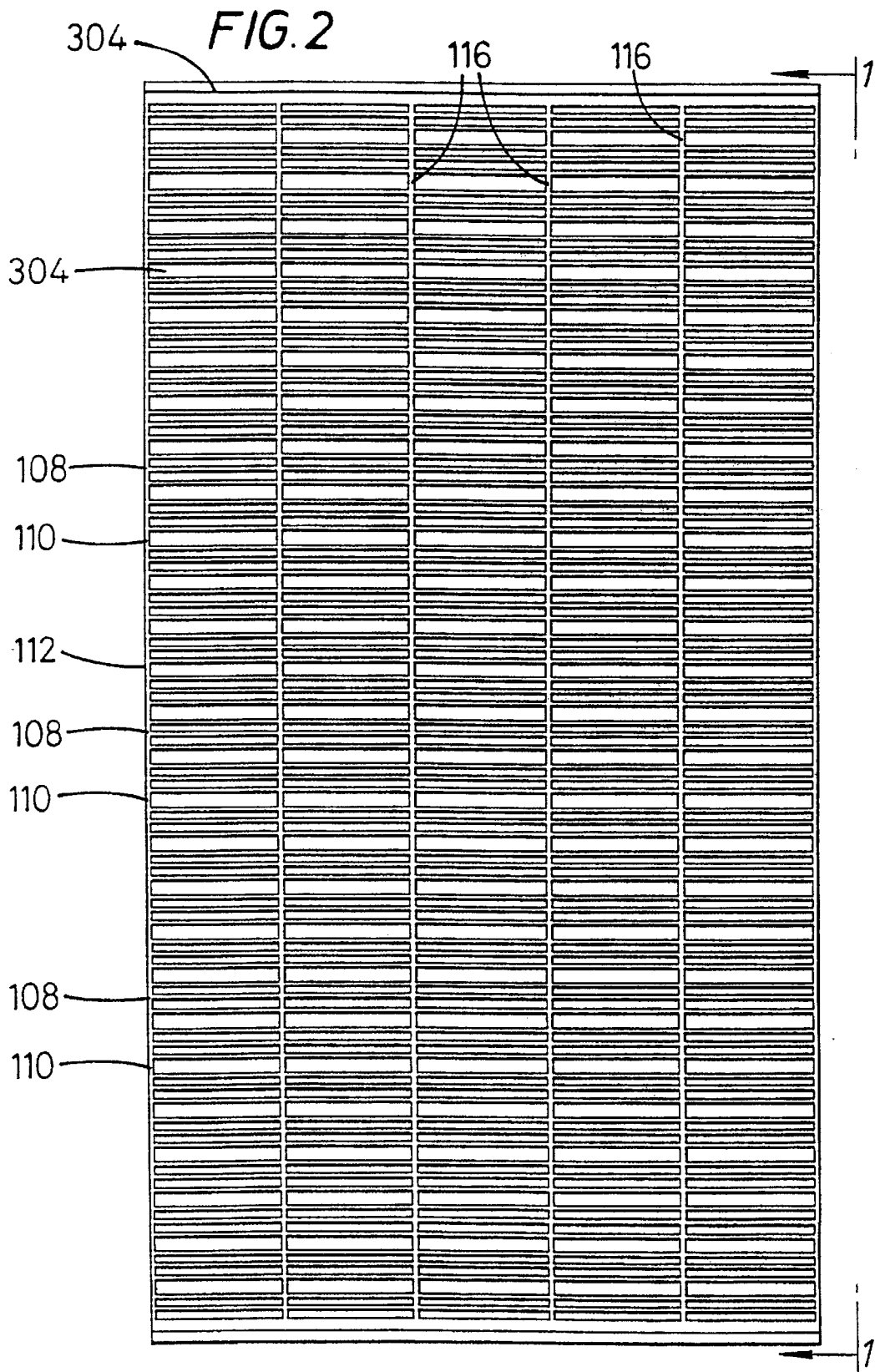
FIG. 2 is a plan view of the screen of FIG. 1.
Figure 9:
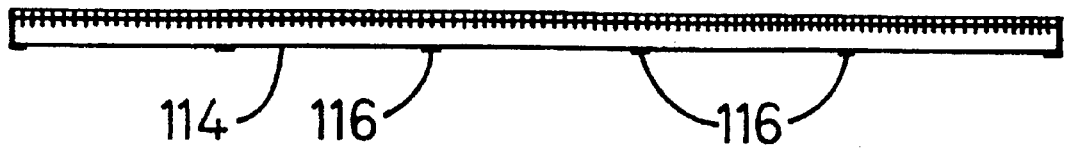
FIG. 9 is an end view of the screen illustrated in FIG. 1.

Referring to FIGS. 1, 2 and 9 vibrating screen 100 includes a first layer 102 of wire mesh web and a second layer 104 of wire mesh web. Preferably, the first mesh layer is made from a web of bolting cloth grade wire mesh. The second mesh layer is a backing mesh. The first and the second mesh layers are supporter on frame 106. The frame is formed to create a plurality of ridges 108 running the length of the screen 100, defining therebetween a plurality of channels 110. Channels run the length of the screen 100 from the back end of the screen to its front end 112. Attached to each side of the screen are hook straps 114. Each hook strap is bonded to the frame 108 and mesh layers 102. Steel straps 116 laterally tension the first and second mesh layers to maintain in the surface of the screen the channels and ridges.

The screen is secured to a shaker in a well known manner by hooking around the hookstraps and tightening rails disposed along the edges of the basket of a shaker (not shown). A series of stringers below the screen (not shown) cause the screen to bow as the rails pivot downwardly as they are tightened.

During operation, material containing solids to be separated is poured onto the back of the screen. Solids tend to collect in the channels and move toward the front end of the screen when the screen is vibrated. Fluid and particles smaller than the openings in the layer of mesh flow through the mesh along the sides of ridges 108 and the bottoms of channels 110.

Figure 3:
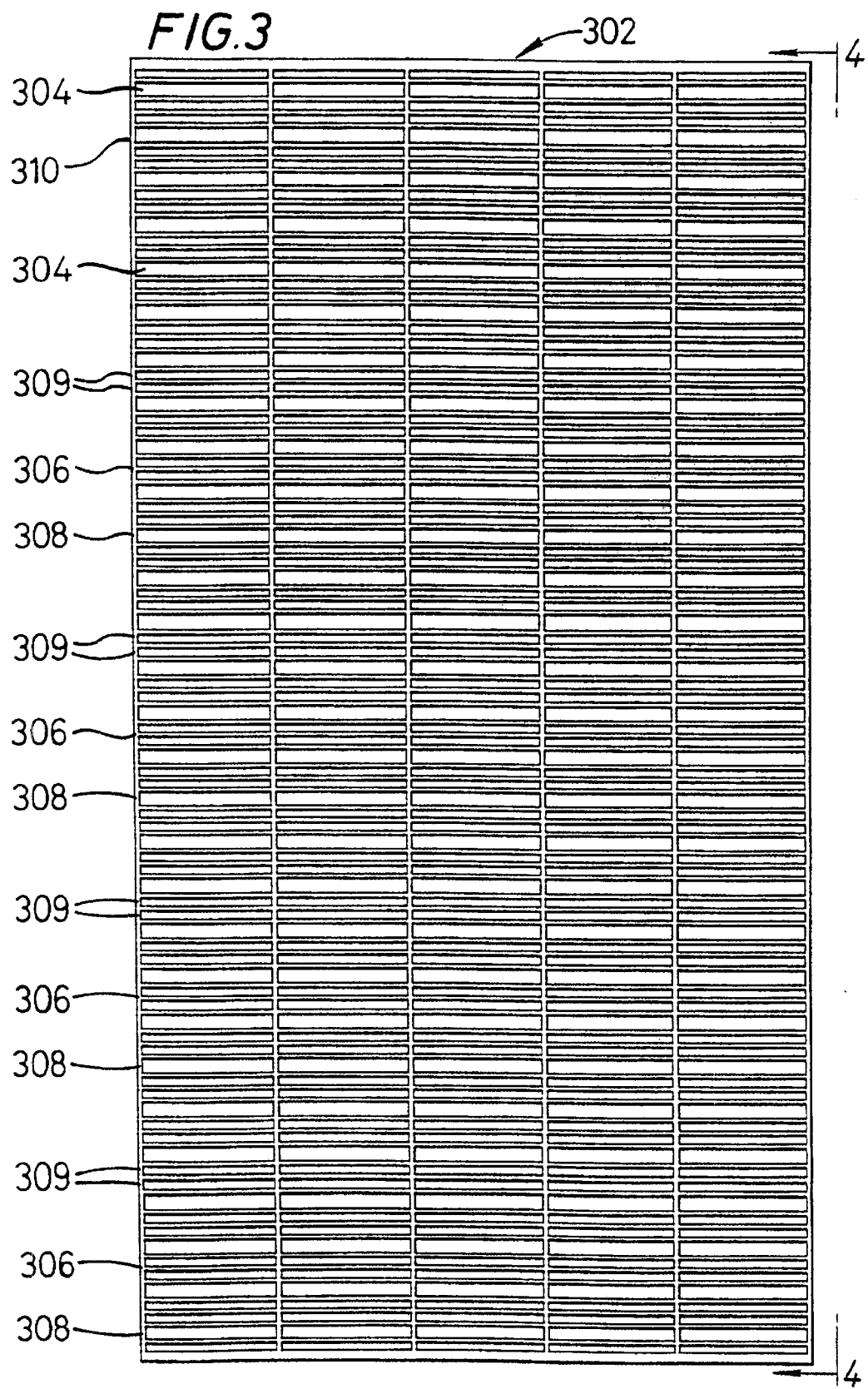
FIG. 3 is a plan view of an alternate embodiment of a screen according to the invention.

Referring now to FIGS. 3 and 4, in an alternate embodiment of screen 100, a first layer of wire mesh 402, a second layer of wire mesh 404 and a third layer of wire mesh 405 (the wire meshes are shown only in FIG. 4 exploded away from panel 302) are bonded to panel 302 to form screen 400. The first and second layers are a bolting cloth grade wire mesh. The third lay 405 is a mill grade or market grade wire mesh supporting the first and second layers. The panel is formed from a sheet of metal by punching or cutting an array of elongated, rectangular openings 304 into the sheet of metal according to a predetermined pattern. The openings have uniform size and shape. The sheet is then bent with a press or rolled into a corrugated configuration substantially as shown in FIG. 4. The corrugated configuration is comprised of alternating series of triangular shaped ridges 306 and flat bottom channels 308. Each triangular ridge 308 has two substantially flat side surfaces separated by a narrow peak 309.

Along each end of the panel is bonded a frame 310. Frame 310 is contoured to fit and provide support for the ridges 306. The screen is formed so that its side edges run along the peak of a ridge 306. Terminating the sides of the screen along a ridge helps to prevent material from falling between the screen and the inside wall of a shaker basket (not shown) over which the screen is placed.

Although other ridge geometries having flat surfaces may be used, the triangular configuration of the ridges and the flat bottom of the channels tend to maximize effective flat surface area for placement of the openings 304. Each opening 304 is located on a flat surface of either a side of a ridge or a bottom surface of a channel. The rectangular shape of the openings allow as much of the flat surface to be cut with openings as is possible while leaving enough solid area to remain to form a grid or lattice-like structure that will retain its shape and not break during normal use.

Once the panel is formed, the first layer 402, the second layer 404 and third layer 405 of wire mesh are heated and then bonded to the panel. The heating expands the wire mesh. After the wire mesh is bonded to the panel, it cools and contracts, thus tensioning the wire mesh. Tensioning helps to maintain uniformity of the wire mesh and to keep the first and second layers of wire mesh together during operation, thus giving the screen a finer cutting point. Tensioning the wire mesh also assists in conveying particles to the end of the screen. A slack screen will not convey particles as well, especially when heavily loaded.

Figure 5:
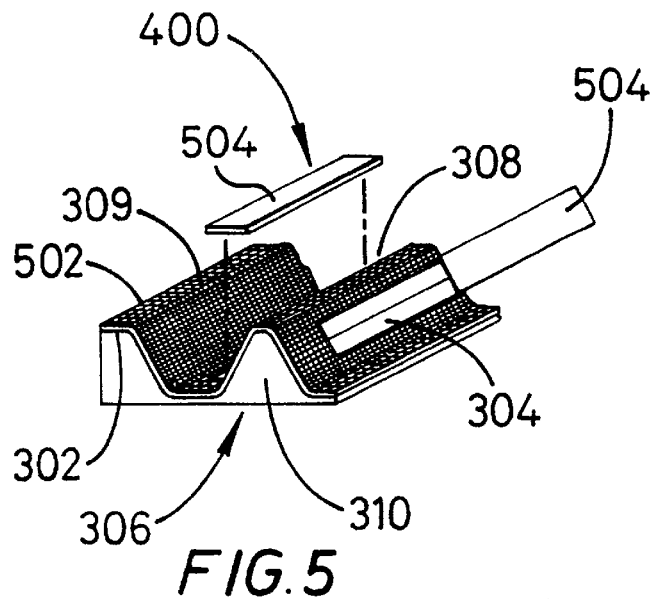
FIG. 5 is a perspective view of a portion of a screen like that of FIGS. 3 and 4.

Referring now to FIG. 5, a perspective view of a portion of a screen 400 shows a layer of wire mesh 502, which includes wire mesh webs 402, 404 and 405 (FIG. 4) bonded to panel 302. Should a tear develop in wire mesh layer 502, the wire mesh surrounding the tear is cut from around the opening 304 in which the tear occurs. A plug 504 is then inserted into the opening in the screen to seal the screen.

Figure 6:
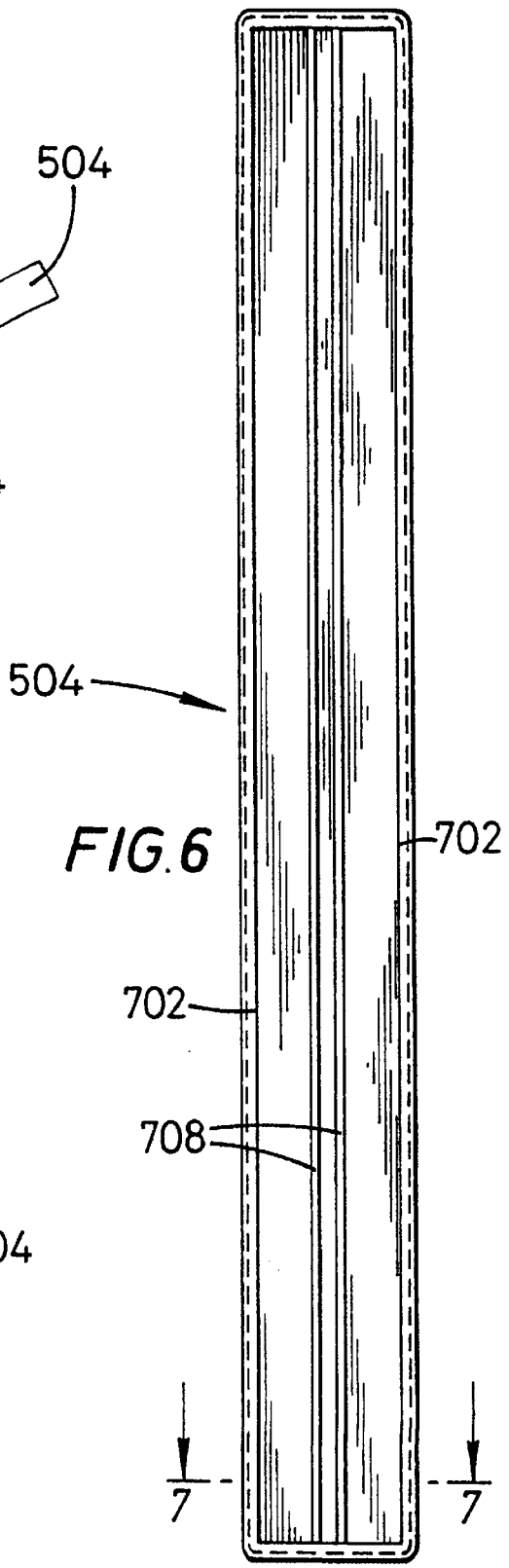
FIG. 6 is a top plan view of a plug for repairing the screen of FIG. 5.
Figure 7:
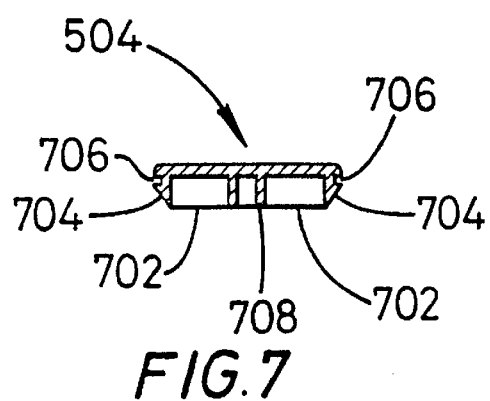
FIG. 7 is a cross-section of the plug of FIG. 6, taken a long section line 6–6.

Referring now to FIGS. 6 and 7, plug 504 is made of an elastic rubber or similar elastomeric material. Its width and length are very slightly larger than one of the openings 304. It has a flat top section surrounded on all sides by a skirt-like side edge 702. The side edge is adapted for enabling the plug to be manually inserted into one of the openings 304 and to seal securely against the side of the opening. The side edges have an outwardly tapering bottom section 704 and a channel 706. The tapering bottom section is sufficiently flexible enough to deflect inwardly under force of the edges of the opening when the plug is pushed into the opening. Deflection of the bottom of the sides pulls inwardly a lower edge of channel 706, thereby providing sufficient clearance to push the plug further down into an opening 304 to the point the upper edge of the channel engages the upper edge of the opening. The width of channel 706 is slightly larger than the thickness of the edge of an opening 304 (which includes the thickness of the panel and two layers of wire mesh). Therefore, the bottom tapering section 704 springs back, locking the plug into place and sealing it against the edges of the opening. Support ribs 708 provide lateral strength to the plug so that it does not deflect downward when loaded during operation, in a manner that would pull the top edge of the channel away from the edge of the opening and allow the load to force the plug through the bottom of the opening.

Figure 8:
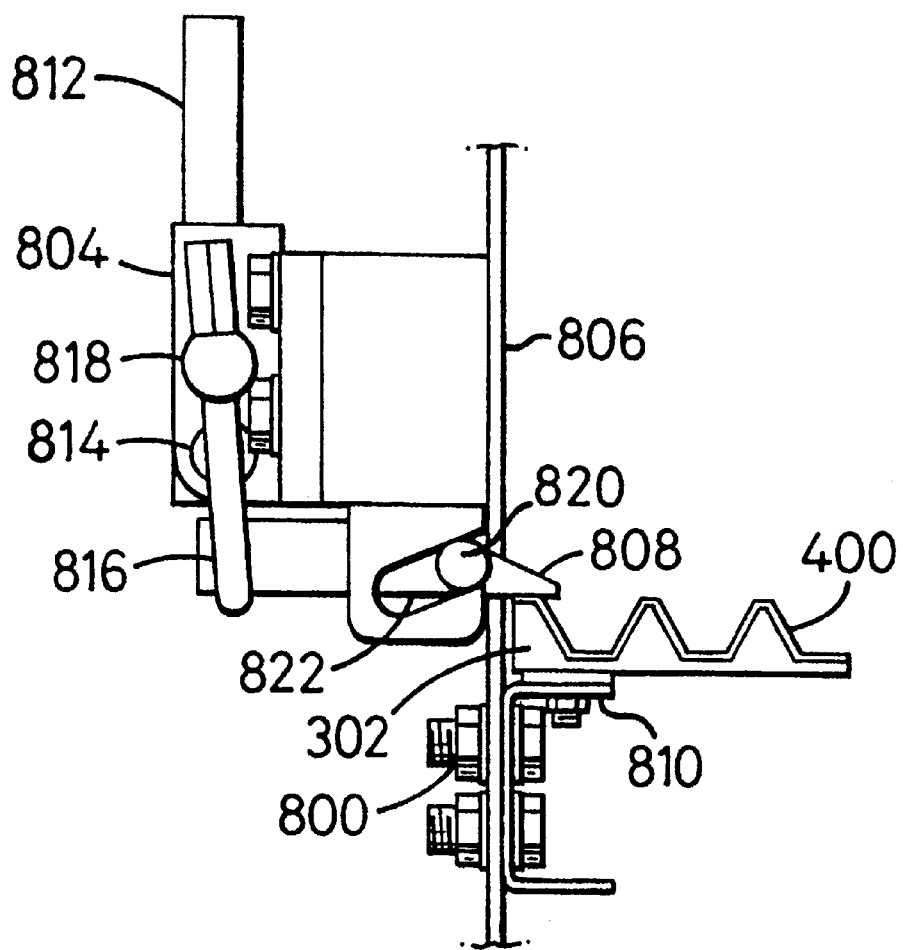
FIG. 8 is an end view of a portion of an end view screen like that of FIG. 5 mounted to basket of a shaker, showing a latching mechanism for securing the screen to the shaker.

Referring to FIG. 8, the screen 400 is secured to a basket of a shaker (not shown) using cam latch 804. Latch 804 is secured to side wall 806 of the basket 802. A latching end of latching bar 808 extends through an opening in the wall to engage the top of screen and to force the screen against bracket 810. Handle 812 pivots about pin 814. U-bolt 816 is connected through rod 818. Rod 818 extends through handle 812. The other end of the U-bolt (not seen) is connected in a similar fashion to other end of the rod so that the U-bolt is permitted to swing about rod 818 under the handle 812. When handle 812 is pivotted upwardly, the saddle of the U-bolt lifts up on latching bar 808, causing the latching bar to pivot about pin 820 and press against the screen. Pulling down on handle 812 lowers the saddle of U-bolt 816, permitting the latching bar to pivot counter-clockwise and release the screen. To assist in quickly replacing the screen, slot 822 allows pin 820 to be moved back and thus allows the latching member 808 to be pulled behind the side of the basket.

Figure 10:
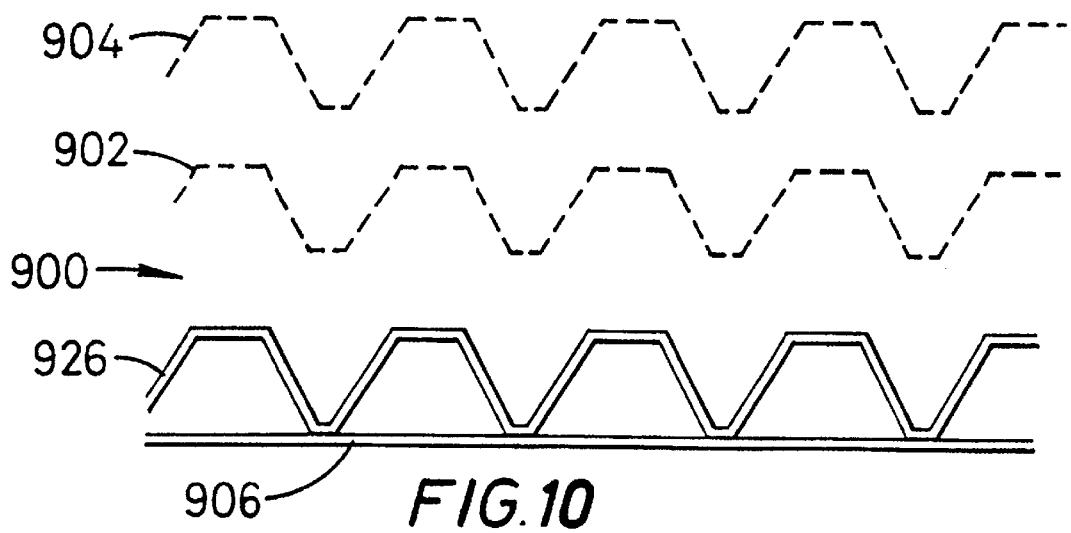
FIGS. 10 and 11 are end views of screens.

FIG. 10 shows a screen 900 like the screen 100 (FIGS. 1,2) with a similar length and width (see FIG. 2), but with a somewhat different screen shape as viewed from the end (e.g. as in FIG. 1). The screen 900 has a first layer of wire mesh 902 and a second layer of wire mesh web 904. It is within the scope of this invention to use only one screening layer for any screen described herein or to use three or more layers. A frame 906 (like the frame of the screen 100) supports the mesh and-or screening layers. In one aspect the layers shown for the screen rest one on top of the other and in another aspect one or more or all of the layers are bonded together and in another aspect they are bonded to the frame across their entire surfaces or only around the periphery thereof. The frame 906 is configured and shaped to correspond to the corrugated shape or undulating shape of the layer(s) above it; alternatively the layer(s) may be made to correspond to the shape of the frame (as viewed on end as in FIG. 1). Ridges 908 have relatively elongated flat tops as compared to the length of the flat tops of the ridges of the screen 100 and flat valleys 912 of the frame 906 are relatively short as compared to the valleys of the screen 100. It is within the scope of this invention for the ridges and valleys to have any desired width or shape.

Figure 11:
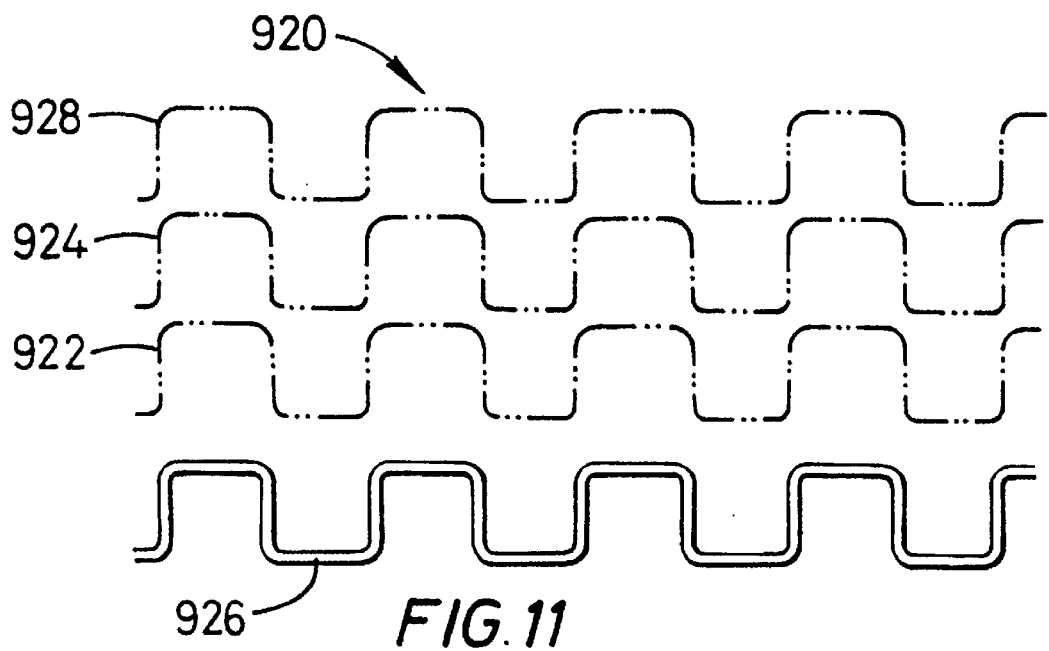

FIG. 11 shows a screen 920 like the screens 100 (FIGS. 1,2) and 900 with a similar length and width (see FIG. 2), but with a somewhat different screen shape as viewed from the end The screen 920 has a first layer of wire mesh 922, a second layer of wire mesh web 924 and a third layer of mesh or screening 928. A frame 926 (like the frame of the screen 900) supports the mesh and-or screening layers. In one aspect the layers shown for the screen rest one on top of the other and in another aspect one or more or all of the layers are bonded together and in another aspect they are bonded to the frame across their entire surfaces or only around the periphery thereof. The screens 900 and 920 may be used with or without straps (e.g. as the straps 114 and 116, FIG. 9). Individual cells of the screens 900 and 920 may be shaped as the individual cells of the screens of FIGS. 2 and 3 or they may be any desired shape, including but not limited to, oval, square, trapezoidal, or triangular (acute, obtuse, isosceles, congruent). The cells of the screens 900 and 920 are repairable as are cells of the previously-described screens.

Figure 12:
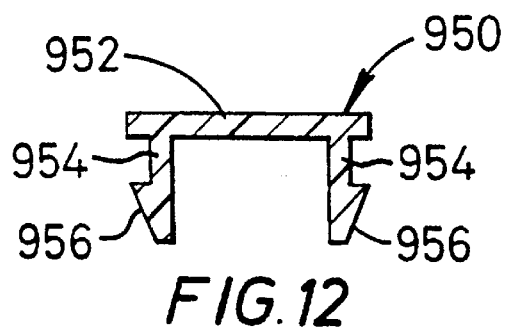
FIG. 12 is an end view of a plug according to this invention.

FIG. 12 shows a plug 950 for plugging off a cell of a screen according to the present invention. The plug 950 has a body. member 952 and ears 956 which project from legs 954 depending from the body member 952. The plug 950 is made from a resilient material so the legs 954 are bendable to permit the ears 956 to enter a cell to be repaired and then expand outwardly so the ears catch and hold on an edge of the cell.

It is within the scope of this invention to have a plug held in a cell by friction fit, any "snap fit" structure, welding or adhesive. A plug according may be any desired shape to fit in and mate with the shape of a cell. The plug may be solid or it may be solid with openings, holes or perforations therethrough. In one aspect in which a cell is not initially behind a torn screen area a cell or cells is placed at the torn area on one side of the screen and a plug is inserted into the cell from the other side of the screen to repair a torn area.

What is claimed is:

1. A screen for a shaker comprising a support panel formed with a series of alternating parallel ridges and channels and a plurality of openings formed therein; and a first web being bonded to a surface of the panel to form a complementary series of-alternating ridges and channels or wire mesh, the first web overlaying the plurality of openings and bonded to the panel around each of the openings to form a plurality of cells of wire mesh independently supported within the screen, and at least one of the openings of the plurality of openings not covered with wire mesh and comprising a plugged opening, said plugged opening plugged with a plug disposed therein.

2. The screen of claim 1 wherein the plug is flat.

3. The screen of claim 1 wherein the plugged opening has an interior side and the plug seals against said interior side.

4. The screen of claim 1 wherein the plug is made of elastomeric material.

5. The screen of claim 1 wherein the plug has a flat top section surrounded by a skirt side.

6. The screen of claim 5 wherein said skirt side is flexible.

7. The screen of claim 5 wherein the plugged opening has a top edge and the plug's skirt side has a channel therein, said channel sized for reception therein of the top edge of the plugged opening.

8. The screen of claim 7 wherein wire mesh extends to the top edge of the plugged opening and the channel also receives therein said wire mesh.

9. The screen of claim 7 wherein wire mesh extends to the top edge of the plugged opening and the channel also receives therein said wire mesh.

10. The screen of claim 5 wherein said skirt side is flexible.

11. The screen of claim 5 wherein the plugged opening has a top edge and the plug's skirt side has a channel therein, said channel sized for reception therein of the top edge of the plugged opening.

12. The screen of claim 1 further comprising a second web of wire mesh immediately adjacent to the first web of wire mesh and bonded to the panel, the first and second webs of wire mesh cooperating to prevent particles having a dimension greater than selected size from passing through the screen.

13. The screen of claim 1 wherein at least one of the ridges of the support panel is formed with two or more substantially flat surfaces, each substantially flat surface having defined therein at least one of the plurality of openings.

14. The screen of claim 1 wherein at least one of the channels of the panel is formed with a substantially planar bottom surface between two adjacent ridges and has at least one of the plurality of openings formed in the bottom surface.

15. The screen of claim 1 wherein the panel includes two substantially flat side surfaces forming a ridge having a substantially triangular cross-section, each of the two flat sides of the panel having defined therein at least one of the plurality of openings.

16. The screen of claim 15 wherein at least one of the channels of the panel is formed with a substantially planar bottom surface extending between two adjacent ridges and has at least one of the plurality of openings formed in the bottom surface.

17. The screen of claim 1 wherein the portion of the web of wire mesh across a plurality of the plurality of openings is tensioned across the openings.

18. The screen of claim 17 wherein the web of wire mesh is tensioned by heating the web of wire mesh prior to bonding with the support panel.

19. The screen of claim 1 in combination with a shaker for separating solid particles from a fluid flow.

20. The combination of claim 19 wherein the screen is supported on the shaker such that the ridges are oriented in a direction that is substantially parallel to the direction of the fluid flow.

21. The screen of claim 1 wherein the plug is flat.

22. The screen of claim 1 wherein the plugged opening has an interior side and the plug seals against said interior side.

23. The screen of claim 1 wherein the plug is made of elastomeric material.

24. The screen of claim 1 wherein the plug has a flat top section surrounded by a skirt side.

25. A screen for a separator comprising
a first web of wire mesh,
a second web of wire mesh immediately adjacent to the first web of wire mesh, the first and second webs of wire mesh cooperating to prevent particles having a dimension greater than selected size from passing through the screen,
a support panel formed with a first series of alternating parallel ridges and channels and a plurality of openings; the first web and the second webs being bonded to a surface of the panel around each one of the plurality of openings to create in the first and second webs a second series of alternating ridges and channels complementary with the first series and a plurality of independently supported cells of wire mesh overlaying each of the plurality of openings, and
at least one of the openings of the plurality of openings not covered with wire mesh and comprising a plugged opening, said plugged opening plugged with a plug disposed therein.

26. The screen of claim 25 wherein the plug is flat.

27. The screen of claim 25 wherein the plugged opening has an interior side and the plug seals against said interior side.

28. The screen of claim 25 wherein the plug is made of elastomeric material.

29. The screen of claim 25 wherein the plug has a flat top section surrounded by a skirt side.

30. The screen of claim 29 wherein said skirt side is flexible.

31. The screen of claim 30 wherein the plugged opening has a top edge and the plug's skirt side has a channel therein, said channel sized for reception therein of the top edge of the plugged opening.

32. The screen of claim 31 wherein wire mesh extends to the top edge of the plugged opening and the channel also receives therein said wire mesh.

33. The screen of claim 25 wherein at least one of the ridges of the support panel is formed with two or more substantially planar surfaces, each having defined therein at least one of the plurality of openings.

34. The screen of claim 25 wherein at least one of the channels of the panel is formed with a substantially planar bottom surface between two ridges and has at least one of the plurality of openings formed in the bottom surface.

35. The screen of claim 25 wherein the panel includes two substantially planar and side surfaces forming a ridge having a substantially triangular cross-section, each of the two flat sides of the panel having defined therein at least one of the plurality of openings.

36. The screen of claim 25 wherein the first and second webs of wire mesh are tensioned across a plurality of the plurality of openings.

37. The screen of claim 36 wherein the first and second webs of wire mesh are tensioned across each screen cell by heating the first and second webs of wire mesh prior to bonding with the support panel.

38. The screen of claim 25 including a third web of relatively coarse wire mesh immediately adjacent and underlying to the second web mesh for supporting the first and second webs of wire mesh.

39. The screen of claim 25 in combination with a shaker for separating solid particles from a fluid flow.

40. The combination of claim 39 wherein the screen is supported on the shaker such that the ridges are oriented in a direction that is substantially parallel to the direction of the fluid flow.

41. A screen for a shaker comprising
   a first web of wire mesh,
   a second web of wire mesh immediately adjacent to the first web of wire mesh, the first and second webs of wire mesh cooperating to prevent particles having a dimension greater than selected size from passing through the screen, and
   a relatively rigid support panel including a series of alternating parallel ridges and channels lying in substantially a horizontal plane when attached to a shaker and to which is bonded the first web and the second web to create a complementary series of alternating ridges and channels of wire mesh, wherein
   the panel includes a plurality of openings, the first and second webs of wire mesh being bonded to the panel around each one of the plurality of openings to form a plurality of screen cells within the screen, each screen cell being thereby independently supported by the panel,
   at least one of the openings of the plurality of openings not covered with wire mesh and comprising a plugged opening, said plugged opening plugged with a plug disposed therein,
   each of the ridges in the panel including two flat sides forming a substantially triangular shape, each of the two flat sides having defined therein at least one of the plurality of openings, and
   each of the channels includes a substantially flat, horizontal bottom surface between two ridges and the bottom surface includes at least one of the plurality of openings formed therein.

42. The screen of claim 41 wherein the webs of wire mesh are tensioned across a plurality of the plurality of openings.

43. The screen of claim 41 further including a frame bonded to a side of the panel opposite of the first and second webs of wire mesh for supporting the screen on a shaker.

* * * * *